July 19, 1927.
M. E. ROE
CASTER MECHANISM
Filed Dec. 16, 1921
1,636,325
2 Sheets-Sheet 1
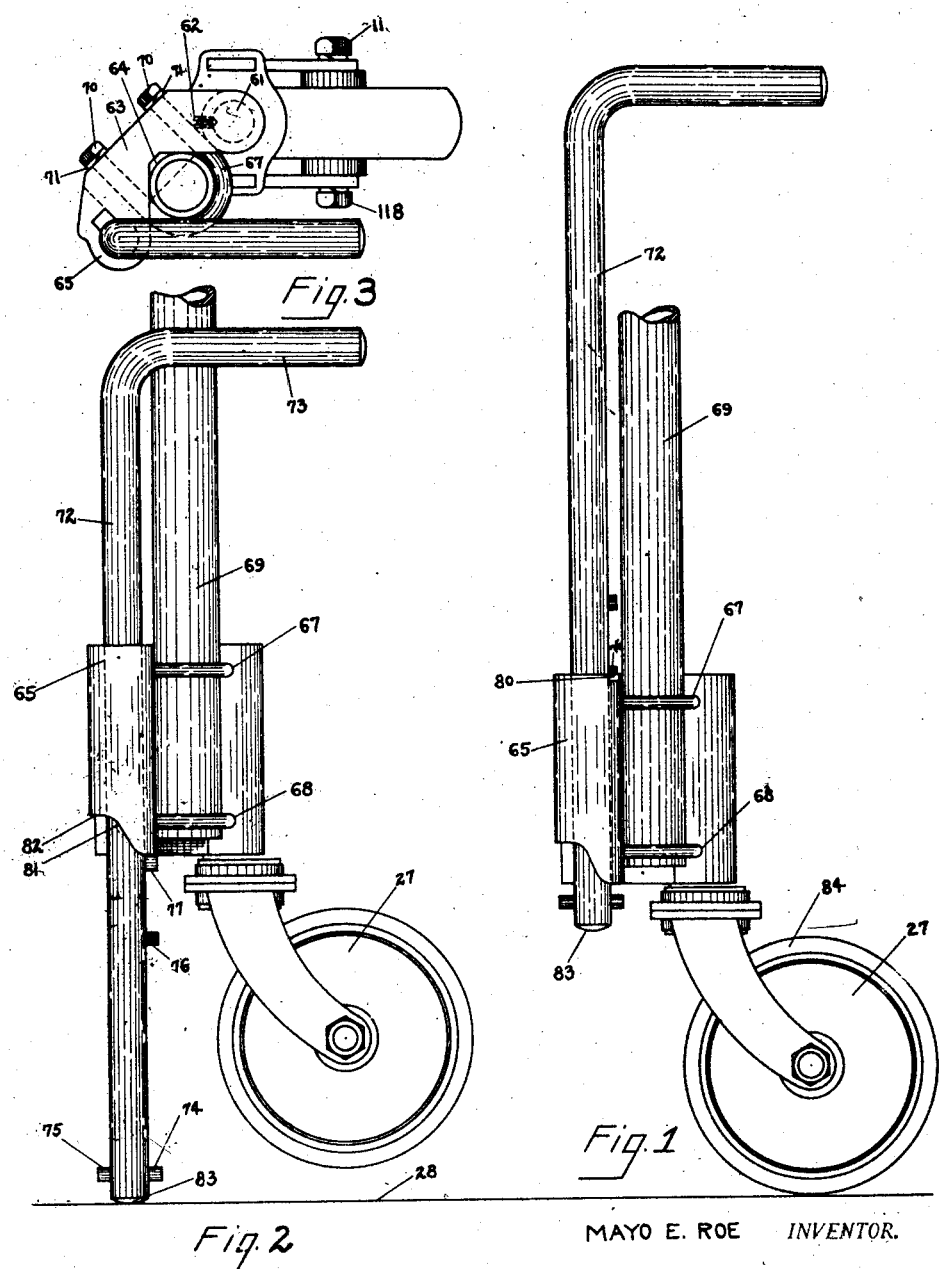
MAYO E. ROE INVENTOR.
BY Richey Slough & Tides
His ATTORNEYS July 19, 1927.

M. E. ROE 1,636,325

CASTER MECHANISM

Filed Dec. 16, 1921

MAYO E. ROE INVENTOR.

BY Richey Slough + Tate

His ATTORNEYS

Patented July 19, 1927.

1,636,325

UNITED STATES PATENT OFFICE.

MAYO E. ROE, OF ELYRIA, OHIO, ASSIGNOR TO THE COLSON COMPANY, OF ELYRIA, OHIO, A CORPORATION OF OHIO.

CASTER MECHANISM.

Application filed December 16, 1921. Serial No. 522,827.

My invention relates to caster mechanisms and more particularly to such caster mechanisms as may be secured to the supporting legs of beds, hospital operating tables, and other types of similar equipment.

It is an object of my invention to provide such a caster mechanism as is applicable to the above purposes, and which may be detachably secured to the supporting legs of such apparatus with the minimum of complication, including a wide range of sizes and shapes of legs for such apparatus, and which will require a very short time to attach to or detach from the apparatus.

Another object of my invention is to provide a lifting lever mechanism carried by the caster mechanism proper, and which lifting lever mechanism is adaptable for use in enabling the bed or other apparatus to be lifted off the caster wheels, thereby making the bed or other apparatus practically rigid. Thus, by means of the caster wheels, the apparatus is made portable, and by means of the lifting lever mechanism, when the apparatus has reached a position where it is to be used, it is capable of being made rigid with a minimum of effort.

Another object of my invention is to provide means whereby the caster may be clamped to the legs of the bed or other apparatus in a practical and easy way, whereby trouble due to alignment of the various parts commonly encountered where the fork stem of the caster is inserted on the inside of the bed leg as is the prior common practice, is eliminated.

Another object of my invention is to provide a new design of bearing wheel composed of pressed steel wheel discs with a cast iron hub and tubular sleeve, the said wheel carrying on its periphery a resilient rubber tire which is capable of being removed, by removal of one of the pressed steel discs in a manner to be hereinafter fully disclosed.

Another object of my invention is to provide a new caster mechanism fork which may be constructed entirely of steel with hardened steel cup and cone ball bearings adjustable to take up the wear as wear occurs, the fork stem portion being held stationary in its fixture, whereby perfect alignment and rigidity may be secured, at the same time the fork itself being free to revolve about the stem.

A further object is to provide such a forked construction whereby the stem may be made of various diameters or lengths, the construction permitting of easy changing from one sized stem to another whenever this is desired.

Another object of my invention is to secure the aforesaid objects in a mechanism which is simple of construction, inexpensive to make and assemble and which will remain in efficient operating condition in use, at the same time providing for a minimum of friction between the wearing parts, and for ready access to the various operating parts as for repair or adjustment; the mechanism at the same time being capable of a wide and extensive use on various types of apparatus.

The aforesaid and other objects of my invention will be better understood by reference to the accompanying drawings, and description thereof which relate to a specific embodiment of this invention for the purpose of explaining the same and of which drawings:

Fig. 1 shows a side elevational view of the caster mechanism of my invention as applied to a bed leg, the bed being supported on a plurality of caster mechanisms, preferably constructed as the one shown.

Fig. 2 shows a side elevational view as in Fig. 1, but with lifting lever mechanism adjusted to the supporting position, the caster wheel in this figure being lifted from the floor.

Fig. 3 shows a top plan view of the caster mechanism shown in Figs. 1 and 2.

Fig. 4 shows a front view of the caster mechanism comprising the fork, portions of the wheel being shown in section to disclose the wheel internal construction.

Fig. 5 shows a top plan view of the upper portion of the caster fork.

Fig. 6 shows a top plan view of the caster bracket.

Fig. 7 shows a side elevational view of the caster bracket.

Fig. 8 shows a section on the line 9—9 of Fig. 7.

Referring now to all of the figures in all of which like parts are indicated by like reference characters, at 128 is shown a fork stem which is rotatably secured within a ball-bearing mechanism comprising portions 41 and 42, a nut 122 being secured on the end of the stem so as to provide a means of clamping the stem member 128 to the ball bearing mechanism, and which ball bearing mechanism carries the transverse fork supporting members 23 and 24 from which members depend the side prong members 25 and 26.

Carried between the prong members 25 and 26 is the caster wheel 27, said caster wheel being mounted on the axle 30 which passes through the prongs 25 and 26, and which is clamped thereto by clamping nuts 118. Lock washers 112 are placed between the under side of the clamping nuts and the outer sides of prongs 25 and 26. Placed immediately on the axle 30 is a tubular sleeve bushing 129, and cast iron hub 31 being carried on the sleeve bushing. The bushing, 129, takes the rotating wear of the load, and can be renewed and serves as a spacer to prevent side friction between hub 31 and fork sides 25 and 26. This bushing, 129, is preferably made of bearing metal such as brass or bronze. The cast iron sleeve bushing has end peripheral portions inclined inwardly as at 32, there being intermediate portions such as 33 however, which are less inclined or not inclined at all whereby an irregular periphery is provided at this point, these irregularities being provided for the purpose of preventing relative rotation of the cast iron hub 31 and the steel disc members 34 and 35 which are clamped together by a plurality of clamping bolts 36 and nuts 37. A hole 56 in the hub 31 is provided to admit lubricating oil to the bearing 129.

The peripheral portions of the discs 34 and 35 flare outwardly and upwardly curvilinearly, the peripherial portions of the two discs being adapted to embrace the lower portions of a rubber tire 39 and form a seat therefor, the tire being removable whenever the two discs are disassociated by removing the nuts 37 and the bolts 36.

The cast iron hub 31 has an intermediate recessed portion, 40, thus providing a space between the portions of the disc members 34 and 35 next adjacent thereto so that a certain amount of flexibility may be had due to the inherent flexibility of the disc member portions.

The transverse fork supporting members 23 and 24 have centrally disposed openings, the members 23 and 24 being pressed upwardly and downwardly respectively, and as shown in Figs. 4 and 5, the transverse member 23 has a circular upstanding ring portion, 41, and the member 24 has a depending like ring portion, 42, these portions 41 and 42 providing a cylindrical opening within which the anuular bearing members are supported. A clamping nut 1 is adapted to be threaded on the outer end of the portion 28 of the forked member in order to retain the stem 128, and the bearings in position on the fork yoke supporting members 23 and 24.

The race members 133 have flanged peripheral portions adapted to fit over the outer edges of the members 41 and 42, and when the cone 127 and set nut 122 are in position, the entire bearing forms a connecting link between the stem 128 and the transverse fork prong supporting members 23 and 24 in such a way that the wheel 27 is rotatably carried between the fork prongs 25 and 26, and the wheel and fork prongs together with the transverse members 23 and 24 are adapted to rotate in a horizontal plane on the said bearings.

The fork stem, 128, is insertable into the cylindrical recess, 61, of the cast iron caster bracket shown best in Figs. 3, 6 and 8, and is adapted to be secured tightly within the said recess by a set screw, 62, passing through a wall of the bracket, 63. The bracket, 63, has an intermediate portion containing a bed post receiving notch, 64, a fork receiving recess portion, 61 and a lifting lever receiving cylindrical portion, 65; the shape of notch 64 adapts itself to either cylindrical or square shaped legs of various dimensions, and of other various shapes. Openings are provided at 66 to receive U shaped bed post clamping bolts, 67 and 68, which embrace the bed post leg, 69, and which clamp the same tightly against the notched portion 64 of the bracket; securing nuts, 70 and lock washers, 71, hold the bracket securely to the bed post. The bracket has a cylindrical portion before mentioned, 65, for the reception of the lifting lever, 72, said lifting lever having a horizontal handle portion, 73, and on the upright portion carries inserted pins, 74, 75, 76 and 77.

The cylindrical opening, 78, on one side communicates with a substantially rectangular shaped notch, 79, which is formed in one of the side walls of the opening, and which is provided for the purpose of admitting the pins 74, 76 and 77 which are attached to the lever rod, 72, when the lever rod is passed through the opening, 78, in assembling the apparatus. After this is done the pin, 75, is inserted in the end of the rod, 72, or if desired the pins 74 and 75 may be in fact one pin, insertable through the rod, 72, after assembly.

The provision of pins such as 74 and 75 projecting from each side of the rod, 72, is to prevent the lever, 72, being detached from the apparatus after assembly and lost. When not in use, the lever rod, 72, is in the position shown in Fig. 1 wherein the pin, 76, rests within a notch, 80, located in the upper edge of the cylindrical portion, 65.

The lower edge, 81, of the cylindrical portion, 65, is cut away so as to form a cam surface whereby a pin such as the pin, 77, located at a position indicated at 82 may by rotation of the rod, 72, take the position shown in Fig. 2 at 77.

This will result in a lifting of the wheel, 27, from the floor, 28, since the lower end, 83, of the rod, 72, will engage the floor as the pin, 77, will cam the caster bracket, 63, upward together with the leg, 69, of the bed or other apparatus so that this leg will be lifted, the wheel taking the elevated position shown in Fig. 2.

The lower edge of the tubular portion, 65, engaged by the pin, 77, as shown in Fig. 2 where the lifting rod lever is supporting the apparatus, is not inclined, but horizontal, and it may even be slightly notched, if desired, to the end that the lifting rod lever will remain in a set operative position such as shown in Fig. 2. A provision of the pin, 76, as shown best in Fig. 1 is for the purpose of lifting the lever rod, 72, so high that the top, 84, of the tire on the caster wheel, 27, will miss contact with the bottom end, 83, of the rod when out of use, as shown in Fig. 1, and when the wheel, 27, may be swiveled to the reverse position from that shown, wherein it will be located just below the rod, 72.

Having thus described my invention in a specific embodiment, I am aware that numerous and extensive departures may be made from the embodiment herein illustrated and described but without departing from the spirit of my invention.

I claim:

1. The combination with a leg, of supporting mechanism therefor comprising a bracket formed with a pair of vertically extending sockets, means for securing said leg to said bracket, a caster wheel structure secured within one of the sockets in said bracket, an adjustable supporting rod carried by the other socket in said bracket, means for maintaining the lower end of said rod in a plane above or below said caster wheel.

2. The combination with a leg, of supporting mechanism therefor comprising a bracket having sockets at the ends thereof and a notch in one side thereof intermediate the sockets, means for clamping the lower end of said leg against the notched portion of said bracket, a swiveling caster wheel structure secured in one of the sockets in said bracket, an adjustable supporting rod carried in the other socket in said bracket, and means cooperating with said bracket for maintaining the lower end of said supporting rod in a plane either above or below said caster wheel.

3. The combination with a leg, of supporting mechanism therefor comprising a bracket having a vertically extending aperture and socket, a swiveled caster wheel mechanism secured in the socket in said bracket, means for securing the lower end of said leg to said bracket, and a supporting rod slidable in the aperture in said bracket; said rod having bosses extending therefrom for engaging the top and bottom surfaces of said bracket to maintain the lower end thereof in a plane above or below said caster wheel.

4. The combination with a leg, of supporting mechanism therefor comprising a bracket having apertures extending vertically therein and a side intermediate the apertures notched to receive the lower end of said leg, U-bolts secured through said bracket for clamping said leg thereto, a caster wheel structure secured in one of the apertures in said bracket, and a vertically adjustable supporting rod carried in the other aperture in said bracket, the lower end of said rod being adapted to be maintained in a plane above or below said caster wheel.

5. In combination with a leg, of supporting mechanism therefor comprising a bracket having angularly disposed portions, one portion having a socket recess extending upwardly therein, a caster wheel carrying stem projecting and secured within said socket, means for securing said bracket to said leg, with the angularly disposed portions embracing a portion thereof, at least one of said portions having a transverse aperture therethrough, said securing means projecting through the said aperture.

6. The combination with a leg, of supporting mechanism therefor comprising a bracket having angularly disposed portions, one portion having an aperture extending therethrough, the other portion having a socket recess extending upwardly therein, a caster wheel carrying stem projecting and secured within said socket, means for securing said bracket to said leg, with the angularly disposed portions embracing a portion thereof, adjustable supporting means reciprocable through said opening, and means cooperating with the walls of said aperture for adjustably maintaining the lower end of said adjustable supporting means in a plane above or below the lower surface of said caster wheel.

7. The combination with a leg, of supporting mechanism therefor comprising a bracket having angularly disposed portions, one portion having an aperture extending therethrough, the other portion having a socket recess extending upwardly therein, a caster wheel carrying stem projecting and secured within said socket, means for securing said bracket to said leg, with the angularly disposed portions embracing a portion thereof, adjustable supporting means comprising a rod reciprocable through said opening, and means cooperating with the walls of said aperture for adjustably maintaining the lower end of said adjustable supporting means in a plane above or below the lower surface of said caster wheel, said rod having lateral projections extending therefrom, said apertured portion having a lower edge comprising portions disposed in different horizontal planes, said rod projections adapted to contact with one or the other of the said portions in different planes according to the rotative angular adjustment of the rod to elevate or lower the leg.

8. The combination with a leg, of supporting mechanism therefor comprising a bracket having angularly disposed portions, one portion having an aperture extending therethrough, the other portion having a socket recess extending upwardly therein, a caster wheel carrying stem projecting and secured within said socket, means for securing said bracket to said leg, with the angularly disposed portions embracing a portion thereof, adjustable supporting means comprising a rod reciprocable through said opening, and means cooperating with the walls of said aperture for adjustably maintaining the lower end of said adjustable supporting means in a plane above or below the lower surface of said caster wheel, said rod having lateral projections extending therefrom, said apertured portion having a lower edge comprising portions disposed in different horizontal planes, said rod projections adapted to contact with one or the other of the said portions in different planes according to the rotative angular adjustment of the rod to elevate or lower the leg, said aperture comprising a keyway passage at one side thereof to permit the said rod extensions to pass through the aperture when the rod is reciprocated upwardly while held in a given rotative position to withdraw the rod to non-supporting position, said apertured portion having an upper edge surface against which said projection may contact when so elevated and again rotated.

9. In combination with a leg, of supporting mechanism therefor comprising a bracket having angularly disposed portions, one portion having a socket recess extending upwardly therein, a caster wheel carrying stem projecting and secured within said socket, means for securing said bracket to said leg, with the angularly disposed portions embracing a portion thereof, said securing means comprising a U-bolt embracing the leg and having its prongs projected through openings in the angularly disposed bracket portions.

In witness whereof, I have hereunto signed my name this 12th day of December, 1921.

MAYO E. ROE.